United States Patent Office 3,161,616
Patented Dec. 15, 1964

3,161,616
POLYOXYMETHYLENE DIETHERS
Northrop Brown, William Philip Langsdorf, Jr., and Carl Earle Schweitzer, Wilmington, Del., assignors to E. I. du Pont de Nemours and Company, Wilmington, Del., a corporation of Delaware
No Drawing. Filed Sept. 6, 1957, Ser. No. 682,325
8 Claims. (Cl. 260—67)

This invention relates to high molecular weight polyoxymethylene diethers as new compositions of matter, and, more particularly, it relates to polyoxymethylene dialkyl ethers having a number average molecular weight of at least 15,000 and having a reaction rate constant for thermal degradation at 222° C. of less than 1% by weight per minute.

Polyoxymethylene diethers have been prepared in the past by H. Staudinger and his co-workers and reported by J. F. Walker in his monograph "Formaldehyde," second edition, Reinhold Publishing Corporation, New York (1953). Heretofore, these polymers have been only laboratory curiosities, since the molecular weights have been too low to be of value as a commercial plastic. This prior art states that such polyoxymethylene diethers are quite stable to thermal effects when the degree of polymerization is about 6 or 7, but that, as the degree of polymerization is increased to 100–150, the thermal stability decreases to the point that decomposition takes place at a temperature below the melting point of these low polymers. Gamma-polyoxymethylene, the prior art name for polyoxymethylene dimethyl ether having a low degree of polymerization, is said to decompose to formaldehyde gas without melting, upon being heated to 160°–210° C. according to Walker. The average degree of polymerization of gamma-polyoxymethylene is about 50–150, while the literature reports that some portions might have a degree of polymerization as high as 300–500, although they have never been isolated. These prior art polymers have been made by the treatment of paraformaldehyde, trioxane, or aqueous formaldehyde with methanol and sulfuric acid for long periods of time at temperatures as high as 150°–180° C. It is believed that these prior art products were incompletely alkylated and that the incomplete alkylation left the polymer molecule chains subject to degradation at the terminal group which was not alkylated.

It has now been found that high molecular weight polyoxymethylene diethers may be made by reacting a high molecular weight polyoxymethylene with a dialkyl acetal, preferably methylal, in an acidic medium at low temperatures. The dialkyl acetal has the general formula

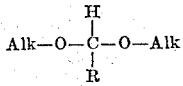

where "Alk" is an alkyl group of 1–6 carbon atoms and R is from the group consisting of hydrogen and alkyl groups of 1–5 carbon atoms. The reaction product is a polyoxymethylene diether, having substantially the same high molecular weight as the starting material and exhibiting an excellent thermal stability as evidenced by a reaction rate constant for thermal degradation at 222° C. of less than 1% by weight per minute, and usually less than 0.1% by weight per minute.

It is an object of this invention to provide high molecular weight, thermally stable polyoxymethylene diethers. It is another object of this invention to provide polyoxymethylene dialkyl ethers having a number average molecular weight of at least 15,000, and, preferably, of at least 30,000, and exhibiting a reaction rate constant for thermal degradation at 222° C. of less than 1% by weight per minute, and, preferably, of less than 0.5% by weight per minute. It is still another object of this invention to provide a process of preparing the high molecular weight polyoxymethylene diethers described herein. Other objects will be apparent from the more detailed description of this invention which follows.

The above objects are accomplished by reacting 1 part by weight of polyoxymethylene having a number average molecular weight of at least 15,000 with 2–1,000 parts by weight of a dialkyl acetal having the above formula, preferably methylal, containing 0.005% to 5.0% by weight of a mineral acid catalyst, and recovering a polyoxymethylene dialkyl ether having a number average molecular weight of at least 15,000 and exhibiting a reaction rate constant for thermal degradation at 222° C. of less than 1% by weight per minute.

In the description of this invention, the property of thermal stability is defined by the value of the reaction rate constant for thermal degradation at 222° C. The decomposition of polyoxymethylene diethers follows, or closely approximates, a first-order reaction, which, in turn, may be expressed in terms of a differential equation:

$$\frac{-dw}{dt} = kw$$

in which $t$ is the elapsed time since the beginning of the decomposition reaction, $w$ is the weight of the material which remains undecomposed at time $t$, and $k$ is the rate constant for the equation. The value of $k$ in this equation is utilized in the description of this invention as the reaction rate constant for thermal degradation. When a polymer exhibits a $k$ of 1% or more, based on a decomposition reaction temperature of 222° C., the polymer is believed to be unsuitable for modern fabrication techniques for thermoplastic materials such as the polyoxymethylene dialkyl ethers of this invention.

The value of the reaction rate constant for thermal degradation at 222° C. ($k_{222}$), as reported herein, is determined by placing about 1 gram of the polymer to be tested in a small ampule open to the atmosphere through a single capillary tip. The ampule is evacuated, filled with nitrogen, and then evacuated a second time and filled with nitrogen a second time. The ampule is then suspended from a balance in a vapor bath at 222° C. The vapor, in all examples herein, has been obtained by boiling methyl salicylate and allowing the vapors which are at 222° C. to 223° C. to surround the ampule and maintain it at a constant temperature. As the polymer in the ampule degrades into formaldehyde vapors, the weight of the remaining solid polymer is recorded at periodic intervals, beginning at the moment the methyl salicylate vapors reach the top of the ampule. These values are then plotted as the logarithm of the weight or weight percent of undegraded polymer versus the corresponding time since the beginning of degradation. These plotted values normally define a line which is essentially straight throughout the major portion of the degradation period. The value of the reaction rate constant for thermal degradation, $k$, is 2.303 times the slope of the plotted line, and is calculated from the straight line portion of the curve. The units of $k$ are reciprocal minutes if the time, $t$, is in minutes, and therefore a $k$ of 0.01 reciprocal minutes is equivalent to 1% per minute and represents a polymer degradation in which 1% of the polymer weight is being degraded per minute of reaction.

Number average molecular weights may be measured by the classical methods of osmometry, although this method is not suitable for the lower range of molecular weights. A more convenient method, used in the examples of this description, involves an analysis for methoxyl groups found on the polymer. By assuming two methoxyl groups per polymer molecule, it is an easy mathematical calculation to translate weight percent of methoxyl into the number of methoxyl groups per 1000 formaldehyde units, and thence into a molecular weight of the polymer. The methoxyl analysis employed herein is the Zeisel method reported in "Official Methods of Analysis of the Association of Official Agricultural Chemists," 7th ed., A.O.A.C., Washington, D.C. (1950), pp. 744–745.

Number average molecular weights of polyoxymethylenes having one or both of its terminal valences satisfied by hydroxyl groups are measured by infrared analysis techniques. These polyoxymethylenes are employed as the starting materials of the present process. The procedure employed in the infrared analysis is to press some of the polyoxymethylene to be analyzed into a film which is translucent and crack-free and is about 5 mils in thickness. The polyoxymethylene may be transformed into a film in the following examples by employing 35,000 p.s.i. of pressure and room temperature, although equivalent pressure and temperature conditions may be used. The film is then scanned by a Perkin-Elmer Model 21 Spectrophotometer, or its equivalent, equipped with calcium fluoride optics. The absorbance is measured at 2.9 microns and at 2.54 microns, the former being a measure of hydroxyl content of the polymer, and the latter being a measure of the amount of oxymethylene chain in the polymer. The base line for the 2.9 micron band is a line joining the minimum absorbance at 2.7 microns with the minimum absorbance at 3.0 microns. The base line for the 2.54 micron band is a line joining the minimum absorbance at 2.1 microns with the minimum absorbance at 2.7 microns. The number average molecular weight may be calculated from these infrared measurements and from a knowledge of whether the polyoxymethylene being tested has 1 or 2 hydroxyls per molecule. If the polyoxymethylene was made in a reaction medium consisting principally of a monohydric alcohol, the polyoxymethylene product will have one hydroxyl per molecule and one alkoxyl (corresponding to the alcohol) per molecule. If the polyoxymethylene was made in a reaction medium consisting principally of water or a dihydric alcohol or a hydrocarbon having water as an impurity, there will be two hydroxyls per molecule. The equation for calculating the number average molecular weight from the infrared measurements is:

$$\overline{M}_n = \frac{X(7850)}{\frac{\text{absorbance at 2.9 microns}}{\text{absorbance at 2.54 microns}}}$$

where $\overline{M}_n$ is the number average molecular weight and $X$ is the number of hydroxyls per polymer molecule.

*Example 1*

The starting material of this example was prepared according to the process of Example 1 of copending application, Serial No. 700,339, filed by N. Brown, D. L. Funck, and C. E. Schweitzer, on December 3, 1957, now Patent No. 3,000,861. In the reference example an aqueous solution of formaldehyde, containing 68.8% formaldehyde and containing 0.0848 part by weight of acetic acid per 0.12 part by weight of N-ethylpiperidine per 1.0 part of water, was subjected to a temperature of 60° C. for about 30 minutes in order for polyoxymethylene seed particles to form, following which the temperature was maintained at 95° C. and the formaldehyde concentration was maintained at 54.8%–53.6% for about 3.9 days, by which time the seed particles had grown to a number average molecular weight of 39,000.

A 5.005 gram portion of the above polyoxymethylene was placed in a 300 ml. 3-neck round bottom flask fitted with a paddle agitator. The flask was placed in a constant temperature oil bath maintained at 38° C. All glassware had been baked at 110° C. prior to use. Into the flask was added 170 grams of methylal containing 0.10% by weight of sulfuric acid. The methylal employed in this step was of reagent grade and had been subsequently purified by standing with metallic sodium for 4 days followed by being distilled in the presence of anhydrous sodium carbonate. The mixture of polyoxymethylene, methylal, and sulfuric acid was gently agitated for 23 hours at 38° C. Dioxane in an amount equal to ⅓ of the volume of the reacting mixture was added to the flask and the entire contents filtered. The filtered product was washed with dioxane, and then with a 3:1 volume mixture of water/methanol, and finally with acetone. After being air-dried at room temperature the product weighed 4.837 grams, amounting to a recovery of 96.6%.

In order to remove any unreacted polyoxymethylene, 4.511 grams of the above product were placed, along with 200 ml. of redistilled benzyl alcohol containing 0.2% by weight of redistilled tripropylamine, in a 12-ounce pressure bottle equipped with stainless steel inlet and exit nitrogen lines, a thermocouple well, and a magnetic stirring mechanism. The bottle was placed in a silicone oil bath, purged thoroughly with nitrogen, and finally pressurized wtih nitrogen to 10 p.s.i. gauge. The bath was heated rapidly, while the mixture in the bottle was stirred, and after 15 minutes the temperature of the mixture was 158° C. and the polymeric particles were completely dissolved. The temperature was maintained at 158°–165° C. for five minutes more and then cooled by cooling the bath. Seven minutes later (27 minutes from the beginning) the temperature was 112° C. and the polymeric particles had precipitated from solution. The mixture was cooled to room temperature, filtered, washed four times with acetone at room temperature, and dried. The recovered product weighed 2.453 grams which represented 54.4% recovery over this one step or 52.5% recovery based on the original starting material.

The product was found to have a reaction rate constant for thermal degradation at 222° C. ($k_{222}$) of 0.2% by weight per minute with no detectable faster initial rate of degradation due to small amounts of unreacted polymer. A portion of the product was hot-pressed at 195° C. and 20,000 p.s.i. to produce a film 3.0–3.5 mils (0.003–0.0035 inch) thick, and, after aging the film in air at 105° C. for 7 days, the film could be folded and creased along a line, and folded and creased in the reverse direction along the same line without breaking the film. The film, therefore, had a degree of toughness of at least 1, as described in U.S. Patent 2,768,994 issued October 30, 1956 to R. N. MacDonald. Similar films containing a polyamide thermal stabilizer and a phenolic antioxidant also had a degree of toughness of at least 1. The product was analyzed for methoxyl groups, and the analytical result corresponded to a number average molecular weight of 40,000.

*Example 2*

The starting material of this example was prepared according to the process of Example 1 of copending application Serial No. 700,338 filed by N. Brown, D. L. Funck, and C. E. Schweitzer, on December 3, 1957, now Patent No. 3,000,860. In the reference example a methanol solution of 71.9% by weight of formaldehyde, 2.9% by weight of N-ethylpiperidine, and 2.3% by weight of phosphoric acid (85%) was maintained at 60° C. for 5 minutes and at 85° C. for an additional five minutes while seed particles of polyoxymethylene formed. The solution containing the seed particles was then held at 105° C. and the formaldehyde concentration was kept at 69–71% until the seed particles had grown to polymer molecules having a number average molecular weight of 32,000.

This polymer was treated with methylal and sulfuric acid as described in Example 1, and the recovery was 98.6%. Unreacted polyoxymethylene was removed as described in Example 1, and the recovery was 49.7%. The over-all recovery of both steps was 49.0%. The product was a polyoxymethylene dimethyl ether, and it was tested and found to have a reaction rate constant for thermal degradation at 222° C. ($k_{222}$) of 0.37% by weight per minute. Films which were made of this polymer were tested as described in Example 1 and found to have a degree of toughness of at least 1. This latter test was passed by the ether-capped polymer without further modification, and also by the same polymer modified by the addition of a phenolic antioxidant and a polyamide as a thermal stabilizer.

*Example 3*

A polyoxymethylene glycol was prepared by the method described and claimed in copending application Serial No. 785,135 filed by H. H. Goodman and L. T. Sherwood on January 6, 1959, now Patent No. 2,994,687. In particular, the polymerization process employed cyclohexane as a reaction medium and dimethyl di(70% octadecyl/30% hexadecyl) ammonium acetate as a polymerization initiator. The product polymer had a number average molecular weight of about 78,000. The product polymer was treated with a mixture of methylal and sulfuric acid as described in Example 1 although the time of treatment was reduced to 1 hour so as to minimize degradation of the polymer. The polymers of Examples 1 and 2 have a much higher degree of crystallinity than the polymer of this example, and, therefore, the polymer of this Example had to be treated more carefully because of the sensitivity of the amorphous regions to degradation by acidic systems. The recovery through this step was 96.0%.

The unreacted portion of the polymer was removed by dissolving 6.00 grams of the product from the previous step in 250 ml. of benzyl alcohol containing 0.5% by weight of tripropylamine by substantially the same procedure as described in Example 1. The polymer dissolved by the time the temperature of the solution reached 145° C. The temperature was then raised to 160° C. and maintained there for 30 minutes, following which the solution was cooled and the polymer product was recovered by filtration, washing, and drying as described in Example 1. The recovery from this step was 10.3%, with an over-all recovery of 9.9% from the beginning of this example. The product was a polyoxymethylene dimethyl ether which exhibited a reaction rate constant for thermal degradation at 222° C. of 0.4% by weight per minute and a degree of toughness of at least 1. The number average molecular weight of this product was 36,000 as determined by methoxyl analysis.

*Example 4*

A polyoxymethylene was prepared as described in Example 2 except that the formaldehyde concentration in the methanol solution ranged from 73.5%–68.5% during the polymerization. The product had a number average molecular weight of about 26,000. This polyoxymethylene was changed into a polyoxymethylene dimethyl ether by treatment with methylal and sulfuric acid as described in Example 1. The recovery over this treatment step was 97.8%. One portion of this polyoxymethylene dimethyl ether was tested for its stability in a strongly caustic medium in the following manner. A pressure bottle, as described in Example 1, was charged with:

14.0 grams of potassium hydroxide
10.0 grams of sodium hydroxide
2.6 ml. of water This mixture was fused by heating it under nitrogen at atmospheric pressure and 205° C. for 30 minutes. The bottle and contents were then cooled, and 4.999 grams of the above-mentioned polyoxymethylene dimethyl ether and 100 ml. of trioxymethylene dimethyl ether (an inert, caustic-stable, solvent for the polymer) were added. The entire contents were agitated in the bottle and heated rapidly under 35 p.s.i. of nitrogen pressure. By the time the temperature had reached 172° C., the polymer was dissolved in the solvent. The temperature was maintained at 172° C. for 30 minutes. Two liquid phases were present: the caustic and the polymer dissolved in the solvent. The bottle and its contents were cooled to room temperature, causing the caustic to solidify and the polymer to precipitate. After the addition of 100 ml. of water, the bottle was reheated to 60° C. to dissolve the caustic. The contents of the bottle were filtered, washed once with dioxane, four times with a 1/1 water/methanol solution, three times with acetone, and dried. The recovery over this caustic-fusion step was 53.6% and 52.7% in replicate runs. The recovered product had an inherent viscosity of 0.64 measured at 90° on a solution of 0.125 gram of polymer in 25 ml. of phenol. The product exhibited a reaction rate constant for thermal degradation at 222° C. of 0.12% by weight per minute. The same polyoxymethylene dimethyl ether subjected to the above caustic-fusion treatment in the absence of the trioxymethylene dimethyl ether solvent exhibited a number average molecular weight of 29,000. The use of the solvent merely facilitates the separation of the product from the caustic because the product is in finely divided form rather than a hard chip.

For a comparison, a portion of the original polyoxymethylene dimethyl ether (prior to caustic treatment) was treated with benzyl alcohol containing 0.5% by weight of tripropylamine as described generally in Example 1 and resulted in a recovery of 52.4%, 53.2% and 53.8% in replicate runs. The inherent viscosity of the product was 0.61 and 0.63; the reaction rate constant for thermal degradation at 222° C. was 0.05% by weight per minute; and the number average molecular weight was 29,000.

*Example 5*

The starting material of this example was prepared according to the general process of Example 1 of copending application Serial No. 700,339, filed by N. Brown, D. L. Funck, and C. E. Schweitzer, on December 3, 1957, now Patent No 3,000,861. More specifically, an aqueous solution of formaldehyde containing 68.2% by weight of formaldehyde and containing 0.0848 part by weight of acetic acid per 0.12 part by weight of N-ethylpiperidine per 1.0 part by weight of water was maintained at 60° C. for 30 minutes while polyoxymethylene seed particles formed in the solution, following which the temperature was raised to 95° C. and maintained there for 0.93 day at a formaldehyde concentration of 55.0% to 53.9% to produce a polyoxymethylene having a number average molecular weight of 16,000.

A 2.250 gram portion of this polyoxymethylene was placed in a flask along with 75 ml. of dibutoxymethane (commonly known as dibutyl formal) containing 0.4% by weight of concentrated sulfuric acid. The flask had been baked at 110° C. prior to use and the dibutoxymethane had been purified by standing over metallic sodium for 2 days followed by being redistilled over sodium carbonate. The mixture of polymer, dibutoxymethane, and sulfuric acid was maintained at 38° C. in an oil bath for 23 hours. The reaction product was filtered, washed first with dioxane, second with a 3:1 volume mixture of water/methanol, and finally with acetone. After drying, the product weighed 1.935 grams, representing a recovery of 86.0% over this step.

The unreacted polyoxymethylene was removed by treatment with benzyl alcohol containing 0.5% by weight tripropylamine as described generally in Example 1. The recovery over this one step was 66.9%, while the over-all recovery based on the original starting material was 57.6%. This product was a polyoxymethylene dibutyl ether having a reaction rate constant for thermal degradation at 222° C. of less than 0.05% by weight per minute. The inherent viscosity of the product was 0.29 measured at 90° C. on a solution of 0.125 gram of polymer in 25 ml. of phenol. This value of inherent viscosity corresponds to a number average molecular weight of about 16,000.

The same polyoxymethylene starting material was reacted with dibutoxymethane and sulfuric acid as described above except that the reaction was carried out at 80° for 18 hours. The product recovery was 33.4% (compared with 86.0% above) over the reaction step, 68.0% (compared to 66.9% above) over the clean-up step, and 22.7% (compared with 57.6% above) overall. The inherent viscosity of this product was 0.24 which corresponds to a number average molecular weight of about 12,000. It may be seen that the effect of higher temperature was to reduce the recovery and to cause some undesirable degradation of the polymer.

*Example 6*

The starting material for this example was prepared by the same process as the starting material for Example 5 above, and had a number average molecular weight of 17,000. The reaction mixture consisted of 10.00 grams of the polyoxymethylene starting material and 335 ml. of methylal containing 0.13% by weight of hydrogen chloride. The hydrogen chloride was dissolved in the methylal by bubbling gaseous, anhydrous hydrogen chloride into the methylal. The reaction conditions and the work-up procedure of filtering and washing were the same as those described in Example 1. The product recovery was 9.27 grams, or a percentage recovery of 92.7%.

The above product was treated as in Example 5 to remove unreacted polyoxymethylene. The recovery over this step was 38.9% and the over-all recovery was 36.1%. The number average molecular weight of the final product, a polyoxymethylene dimethyl ether, was 18,000. The sample was not used to measure the reaction rate constant for thermal degradation in air at 222° C., although experience with similar products indicated that this sample would have had a reaction rate constant of less than 0.1% by weight per minute.

In the foregoing examples the starting material is a polyoxymethylene having a number average molecular weight of at least 15,000. Such polymers may be prepared by the procedures described in U.S. Patent 2,768,994 issued to R. N. MacDonald on October 30, 1956; in U.S. Patent 2,734,889 issued to F. C. Starr on February 14, 1956; in U.S. Patent 2,848,437 issued to W. P. Langsdorf and G. S. Stamatoff on August 19, 1958; or in copending patent applications Serial No. 495,232 filed by A. C. Knight on March 188, 1955, now abandoned, Serial No. 785,135 filed by H. H. Goodman and L. T. Sherwood on January 6, 1959, now Patent No. 2,994,687, Serial No. 700,339 filed by N. Brown, D. L. Funck, and C. E. Schweitzer, on December 3, 1957, now Patent No. 3,000,861, and Serial No. 700,338 filed by N. Brown, D. L. Funck, and C. E. Schweitzer, on December 3, 1957, now Patent No. 3,000,860.

The dialkyl acetal which is one of the reactants of the process of this invention has the general formula

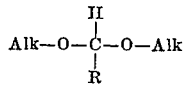

where "Alk" is an alkyl group of 1–6 carbon atoms and R is from the group consisting of hydrogen and alkyl groups of 1–5 carbon atoms. The dialkyl acetal must be a liquid at the reaction conditions of temperature and pressure. Specific examples of the dialkyl acetals which are included within the scope of this invention are dimethoxymethane, acetaldehyde dimethyl acetal, dibutoxymethane, propionaldehyde dibutyl acetal, methoxybutoxymethane, butyraldehyde diethyl acetal, and dihexoxymethane.

The amount of dialkyl acetal which is employed may vary over a rather wide range. It is, of course, theoretically necessary to supply only enough dialkyl acetal to convert any hydroxyl groups on the ends of the polymer molecule chain to alkoxy groups, or, in other words, to an alkyl ether structure. Some polymer molecules will be glycols in that a hydroxyl will be on each end of the chain, while other molecules will have only one hydroxyl per chain because the other end of the chain is an alkyl group, an ester group, or the like. Large excesses of dialkyl acetal over the theoretical amount required for the reaction are employed. Generally, the amount of dialkyl acetal will be from about 2–1000 times the weight of polymer being treated. In the preferred embodiment of this invention the amount of dialkyl acetal will be from 4 to 50 times the weight of the polymer.

An acid catalyst is employed in the process of this invention, and, preferably, the catalyst is a mineral acid such as sulfuric acid, phosphoric acid, and hydrochloric acid. The amount of acid which should be employed will depend upon the concentration of the acid, although it is preferable to use the concentrated form of the acid. Broadly, 0.005% to 5.0%, and preferably 0.02% to 1.0%, by weight of concentrated mineral acid based on the dialkyl acetal may be used in the practice of this invention. It is advisable to maintain the pH of the reacting mixture less than about 3.5, measured on a sample of the reacting mixture diluted 5 times by volume with water, and such a limitation will dictate the amount of acid to be employed.

The reaction conditions may vary rather widely, if poor yields may be tolerated, but it has been found that, when commercially acceptable yields of polymer having a number average molecular weight of at least 15,000 are desired, the reaction temperature should be rather low (15°–50° C.). The time of reaction may be as long as is necessary to reach completion of the reaction without decomposing too much starting polymer, and with long reaction times temperatures as low as 0° C. may be employed. Thus, the temperature and time must be balanced so as to cause an acceptable amount of reaction in a reasonable time. The chain structure of the polymer is sensitive to attack by acids, and may be cleaved by such attack. Therefore, it is important to adjust the reaction temperature and time so that the cleavage which takes place is slow enough and yet the replacement of endgroups is fast enough that an acceptable yield is obtained. In general, as higher and higher temperatures are employed, the extent of decomposition increases faster than the extent of etherification of the hydroxyl groups at the end of the polymer chain until the temperature is so high that decomposition is complete.

The polymer which has been reacted with a dialkyl acetal in the presence of an acid catalyst must be separated from the reaction medium and purified, if necessary, to obtain a homogeneous, stable product. There usually is some unreacted polyoxymethylene which remains after the reaction, and it is normally desirable to remove this material from the polyoxymethylene dialkyl ether before using the latter for the preparation of films, fibers, filaments, bristles, and molded objects. The polyoxymethylene may be removed by dissolving it and heating the solution in the presence of a strong amine or a caustic. Solvents which may be used in the presence of an amine include the aliphatic and aromatic hydroxy compounds such as cyclohexanol, glycol, benzyl alcohol and phenol, and the preferred solvents for the caustic treatment are the ethers, such as trioxymethylene dimethyl ether and diethylene glycol dimethyl ether. Amines and caustics which are useful are triethylamine, tripropylamine, sodium hydroxide, and potassium hydroxide. A particularly desirable caustic is an equimolar mixture of sodium hydroxide and potassium hydroxide because it forms a eutectic at a convenient processing temperature. Another procedure which may be employed for the removal of unreacted polyoxymethylene is the thermal degradation of the solid or molten polymer, or of the polymer in solution, in the absence of an amine or a caustic.

The polyoxymethylene dialkyl ethers of this invention are particularly desirable members of the polyoxymethylene family. These ether-capped polymers may be pressed or extruded into films, spun into fibers, filaments, or bristle material, injection molded, and extrusion molded. The composition of this invention has a remarkably good thermal stability and an excellent resistance to caustic hydrolysis, as shown in Example 4. Polyoxymethylene dicarboxylates, as described and claimed in copending patent application Serial No. 681,188, filed by Dal Nogare and Punderson on August 30, 1957, now Patent No. 2,998,409, are completely destroyed by the caustic-fusion treatment of Example 4.

We claim:

1. A polyoxymethylene dialkyl ether, in which the alkyl ether groups have 1–6 carbon atoms, having a number average molecular weight of at least 15,000 and characterized by having reaction rate constant for thermal degradation at 222° C. of less than 1% by weight per minute.

2. A polyoxymethylene dimethyl ether having a number average molecular weight of at least 15,000 and characterized by having reaction rate constant for thermal degradation at 222° C. of less than 0.5% by weight per minute.

3. A polyoxymethylene dimethyl ether having a number average molecular weight of at least 15,000 and characterized by having reaction rate constant for thermal degradation at 222° C. of less than 0.1% by weight per minute.

4. The process of preparing a polyoxymethylene dialkyl ether which comprises reacting at a temperature of 0°–50° C. a polyoxymethylene having from 1 to 2 of its terminal valences satisfied with a hydroxyl group and having a number average molecular weight of at least 15,000, with 2–1000 parts by weight per part of said polyoxymethylene of a dialkyl acetal having the formula:

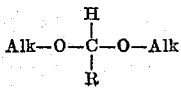

wherein "Alk" is an alkyl group of 1–6 carbon atoms and R is from the group consisting of hydrogen and alkyl groups of 1–5 carbon atoms, in an acidic reaction medium which, when diluted 5 times by volume with water, has a pH of less than about 3.5, and recovering a polyoxymethylene dialkyl ether having a number average molecular weight of at least 15,000.

5. The process of preparing polyoxymethylene dimethyl ether which comprises reacting 1 part by weight of a polyoxymethylene having from 1–2 of its terminal valences satisfied with a hydroxyl group and having a number average molecular weight of at least 15,000, with 2–1,000 parts by weight of methylal containing 0.005%–5.0% by weight of a concentrated mineral acid at a temperature of 15°–50° C. to form a crude reaction product, removing unreacted polyoxymethylene from said crude reaction product, and recovering as a purified reaction product a polyoxymethylene dimethyl ether having a number average molecular weight of at least 15,000 and a reaction rate constant for thermal degradation at 222° C. of less than 1% by weight per minute.

6. A shaped article comprising the polyoxymethylene dialkyl ether of claim 1.

7. A film comprising the polyoxymethylene dialkyl ether of claim 1.

8. A filamentary article comprising the polyoxymethylene dialkyl ether of claim 1.

References Cited in the file of this patent

UNITED STATES PATENTS 2,768,994     MacDonald _____ Oct. 30, 1956

OTHER REFERENCES

Staudinger: "Hochmolekulare Organische Verbindungen," pages 241–244, Berlin, Julius Springer (1932).

Walker: "Formaldehyde," A.C.S. Monograph No. 120 (1953), pages 139–141.